United States Patent [19]

Nakagawa et al.

[11] Patent Number: 5,096,457
[45] Date of Patent: Mar. 17, 1992

[54] LENS DYEING METHOD AND LENS DYEING APARATUS: DYEING LENSES TO GIVE A CONTINUOUS COLOR DENSITY GRADIENT

[75] Inventors: Masahiro Nakagawa, Tama; Kunio Sasaki, Akishima, both of Japan

[73] Assignee: Hoya Corporation, Tokyo, Japan

[21] Appl. No.: 549,966

[22] Filed: Jul. 9, 1990

[30] Foreign Application Priority Data

Aug. 14, 1989 [JP] Japan ................... 1-209790

[51] Int. Cl.⁵ .......................... D06P 5/20; B05D 1/18; B05D 5/06; C02B 5/22
[52] U.S. Cl. .............................. 8/506; 8/479; 8/932; 351/165
[58] Field of Search ............................... 8/506

[56] References Cited

FOREIGN PATENT DOCUMENTS 53-097064 8/1978 Japan .
53-140379 12/1978 Japan .
53-140380 12/1978 Japan .

Primary Examiner—A. Lionel Clingman
Attorney, Agent, or Firm—Oliff & Berridge

[57] ABSTRACT

A dyeing method for dyeing plastic lenses or the like employed as lenses for eye glasses and exhibiting excellent dyeability. The lens is dipped into a dyeing solution while being moved by a combination of a small-amplitude short-cycle time up and down reciprocating motion superimposed on a large-amplitude long-cycle time up and down reciprocating motion. The lens is minutely oscillated according to the small-amplitude short-cycle time up and down reciprocating motion while being periodically moved up and down in the dyeing solution according to the large-amplitude long-cycle time up and down reciprocating motion. The lowest position of the lens obtained by the large-amplitude long-cycle time up and down reciprocating motion is raised gradually. Also disclosed is a dyeing apparatus which is used to carry out that dyeing method.

8 Claims, 4 Drawing Sheets

LENS DYEING METHOD AND LENS DYEING APARATUS: DYEING LENSES TO GIVE A CONTINUOUS COLOR DENSITY GRADIENT

BACKGROUND OF THE INVENTION

1. Field of the Invention

The present invention relates to a lens dyeing method and a lens dyeing apparatus, and more particularly, to a lens dyeing method for plastic lenses for use in eye glasses in such a manner that a color density gradient occurs on the plastic lenses and that the boundary between the dyed portion and the non-dyed portion is vague, as well as a lens dyeing apparatus for use in carrying out such a lens dyeing method.

2. Description of the Related Art

Recently, plastic lenses have been the main type of lens used in eye glasses. Plastic lenses can be readily dyed and therefore employed to make colorful fashionable lenses. Particularly, lenses, on which dyeing is performed in such a manner that the gradient of change in the color density is continuous, can be employed as lenses of highly fashionable eye glasses and thus possess a higher added value. Such lenses are called gradient lenses, gradated lenses or half-colored lenses. Conventionally, dyeing of such gradient lenses is conducted in the manufacturing plants or eye glass shops using a dyeing apparatus which includes a dyeing bath containing a dyeing solution, a device for adjusting the temperature of the dyeing bath and a device for holding and dipping the lenses into the dyeing bath.

In the gradated dyeing method for manufacturing gradient lenses, when the color of a designated area of the lens surface is to be dyed in gradations, a continuous color density gradient is imparted to the boundary portion between the dyed area and the non-dyed area on the lens surface by dipping the designated portion of the lens into the dyeing solution while changing the dipping time of the designated portion and gradually changing the designated portion which is dipped. In a practical operation, the designated portion of the lens is dipped in the dyeing solution contained in the dyeing bath with a motion comprised of a combination of an up and down reciprocating motion of the lens having a small amplitude from a lowest position to a highest position and a short cycle time superimposed on an up and down reciprocating motion of the lens having a large amplitude from a lowest position to a highest position and a long period, as is disclosed in Japanese Patent Laid-Open No. 97064/1978. FIG. 3 shows how the lens position changes by the combination of such superimposed motions. In FIG. 3, a reference numeral 31 denotes a trace of the position of the lens, e.g., the trace of the lowest end portion of the lens caused by the change in the position thereof. In the graph of FIG. 3, the axis of abscissa represents the time, and the axis of ordinate represents the position of the lowest end portion of the lens (the depth of the lowest end portion of the lens from the surface of the dyeing solution contained in the dyeing bath). A reference numeral 32 designates the position of the surface of the dyeing solution in the dyeing bath.

FIG. 4 is a graph showing another method of changing the position of the lens dipped into the dyeing solution, which is disclosed in Japanese Patent Laid-Open No. 43427/1983. In this dipping method, the lens is periodically moved up and down in a vertical line, and as features of the up and down motion, a period of a cycle of the motion is relatively short, and a lowest position of the lens for each cycle gradually rises in the dying solution.

The dyeing method of manufacturing gradient lenses is characterized by the dyeing of the boundary portion between the dyed area and the non-dyed area in the lens such that a clear boundary line of color density is not generated on this boundary portion. As to whether or not the boundary line is formed on the boundary portion depends on the dipping time of the boundary portion of the lens and the controlling method of the up and down reciprocating motion having a large amplitude from a lowest position to a highest position and a long period which is associated with the changes in the position of the lens during the dipping.

In the above dyeing methods disclosed in Japanese Patent Laid-Open Nos. 97064/1978 and 43427/1983, only the dipping time of the lens is adjusted and no proposal is made on the controlling method of the up and down reciprocating motion having a large amplitude. More specifically, the up and down reciprocating motion having a large amplitude draws, for example, a sine curve which always changes at fixed characteristics, as shown in FIG. 5. This means that the lowest depth to which the lens is dipped into the dyeing solution is fixed, and that the lens is always dipped to the fixed lowest position in the dyeing solution. In consequence, if the conventional dyeing method is applied to the dyeing of lenses using a dyeing solution which is capable of dyeing at a high speed or having a high temperature (e.g., 90° C.), which results in a dyeing having high dyeing capability and in which the dyeing density is not proportional to the dipping time, and dyeing of the surface of the lens proceeds at a high speed, making it very difficult to dye the boundary portion of the lens in such a manner that the gradient changes in color density is continuous Furthermore, once plastic lenses possessing hydrophobic property are dipped into the dyeing solution, a film of water is formed on the entire surface of the lens due to the surface tension of the dyeing solution, and the lens surface is thereby made hydrophilic to some extent. In the case of lenses subjected to a hard coating process which employs a coating mainly made of organic silicon and which increases the water repellency of the lens surface, dipping of the lens into the dyeing solution does not itself create the hydrophilic property of the lens but only intensifies the hydrophobic property thereof, increasing the ease with which the boundary line is formed on the boundary portion.

Furthermore, the temperature of the dyeing solution contained in the stain dyeing bath is generally about 70° to 90° C., so the dipped portion of the lens is almost the same temperature whereas the non-dipped portion of the lens is exposed to air, thereby generating a difference in temperature between the dipped and non-dipped portions. As a result, a boundary line may be formed on the boundary portion of the lens and it may become difficult to impart a continuous color density gradient to that boundary portion.

SUMMARY OF THE INVENTION

In view of the aforementioned problem of the prior techniques, an object of the present invention is to provide a lens dyeing method which is capable of dyeing lenses in such a manner that the boundary portion between a dyed portion and a non-dyed portion has a continuous color density gradient and is therefore vague and without any boundary line formed thereon, and which exhibits excellent reproducibility under the same conditions.

Another object of the present invention is to provide a lens dyeing apparatus which is used to carry out the above-described lens dyeing method and which has a simple configuration.

To this end, the present invention provides a lens dyeing method for dyeing a lens in such a manner that a continuous color density gradient occurs on said lens by dipping said lens into a dyeing solution while changing the up and down position of the lens in a dyeing bath on the basis of a combination of a first mode of up and down motion having a small amplitude from a lowest position to a highest position and a short cycle time superimposed in and a second mode of up and down reciprocating motion having a large amplitude from a lowest position to a highest position and a long cycle time period. In this lens dyeing method, the second mode of motion is wholly shifted upward by a predetermined distance for each cycle of the second mode of motion to thereby raise a lowest position of the lens in the dyeing solution reached by each successive down motion for each cycle of that up and down motion to alter the position of a boundary between a dipped portion and a non-dipped portion of the lens.

The present invention further provides a lens dyeing apparatus which comprises a mounting member disposed above a stain bath containing a stain for mounting at least one lens to be dyed, a first driving means for moving up and down the mounting member through a small distance with a short cycle time, a horizontal stage on which the mounting member and the first driving means are mounted, a second driving means for moving up and down the horizontal stage through a large distance and with a long cycle time, and a control means for controlling the operation of the first and second driving means such that a predetermined synchronization is established therebetween.

In the dyeing method according to the present invention, the lens is dipped into the dyeing solution while it is moved up and down on a basis of the combination of the first mode of motion having the small amplitude from a lowest position to a highest position and the short cycle time superimposed on the second mode of motion having the large amplitude and the long cycle time. Furthermore, the dipping motion of the lens is controlled such that the lowest position to which the lens is dipped by the second mode of up and down motion is wholly shifted upward by a predetermined distance for each cycle of the second mode of motion. In consequence, the boundary between the dipped portion and the non-dipped portion of the lens moves gradually, and no boundary line is generated and continuous color density gradient is imparted to the boundary area between the dyed and non-dyed areas of the lens surfaces.

DESCRIPTION OF THE PREFERRED EMBODIMENTS

Figure 1:
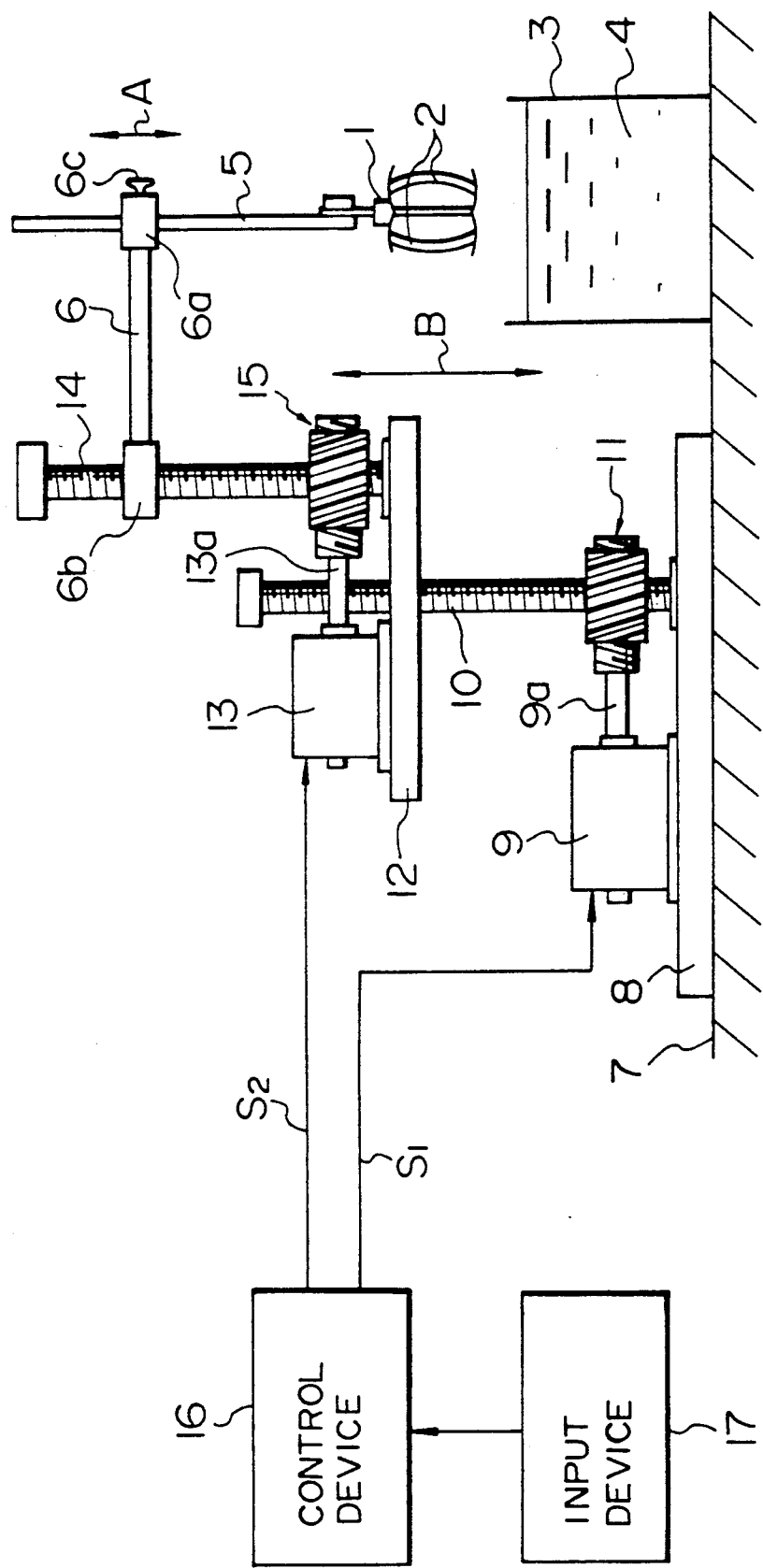
FIG. 1 is a schematic view of a dyeing apparatus5 which is used to carry out a lens dyeing method according to the present invention.
Figure 2A:
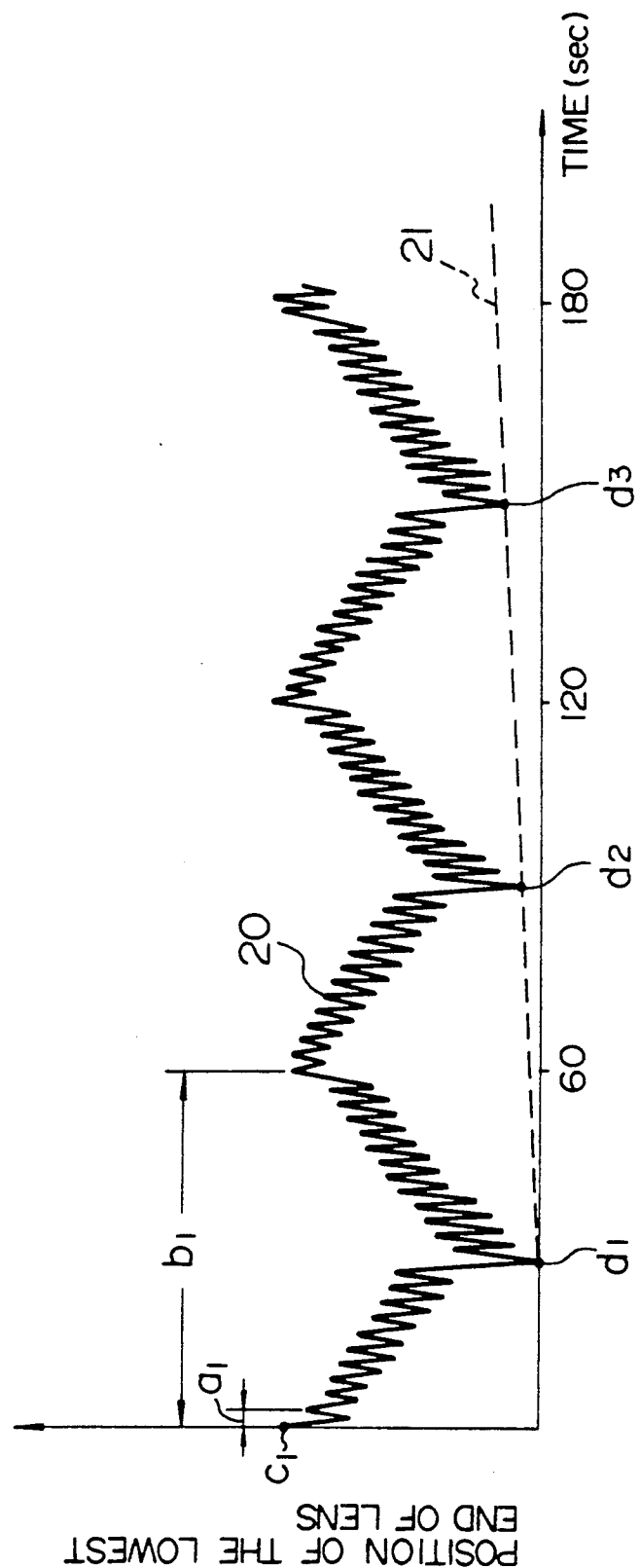
FIGS. 2A and 2B are graphs, showing traces of the motion of the lens in the dyeing method according to the present invention.
Figure 2B:
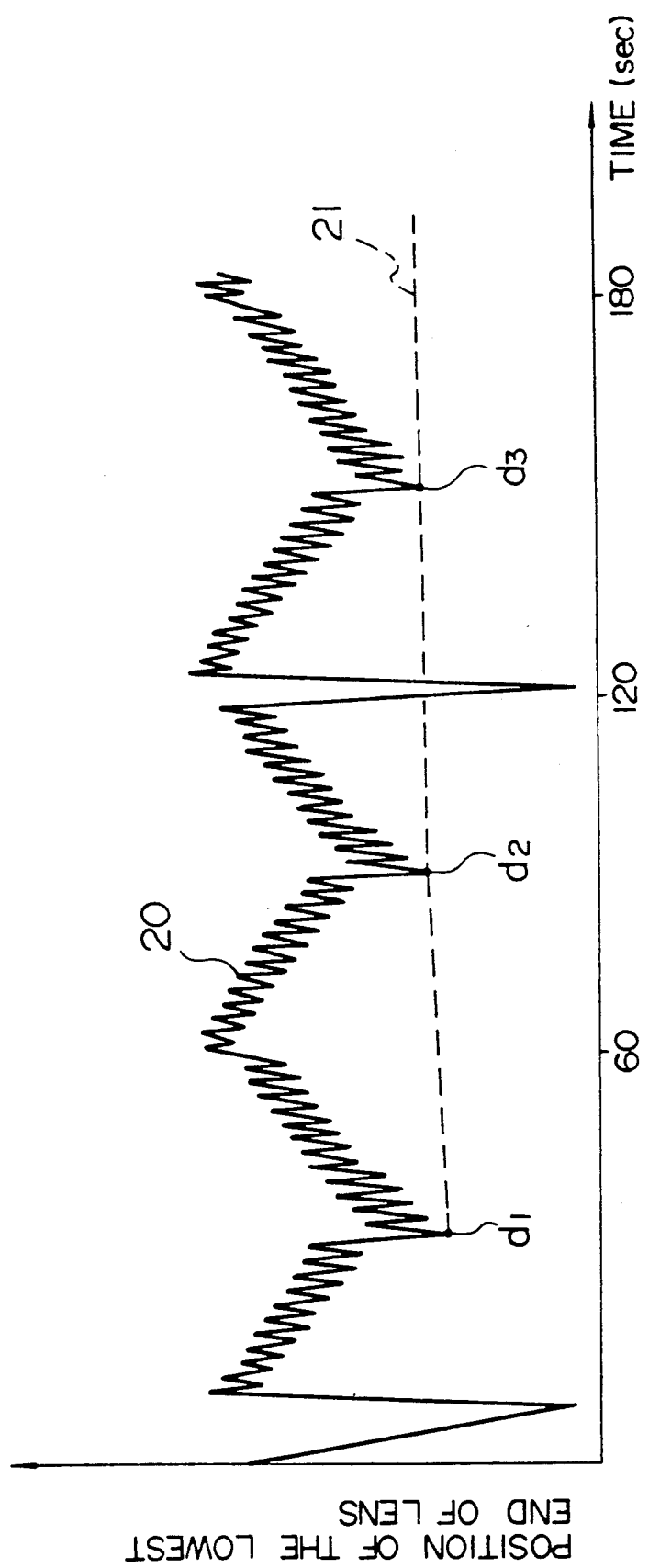
Figure 3:
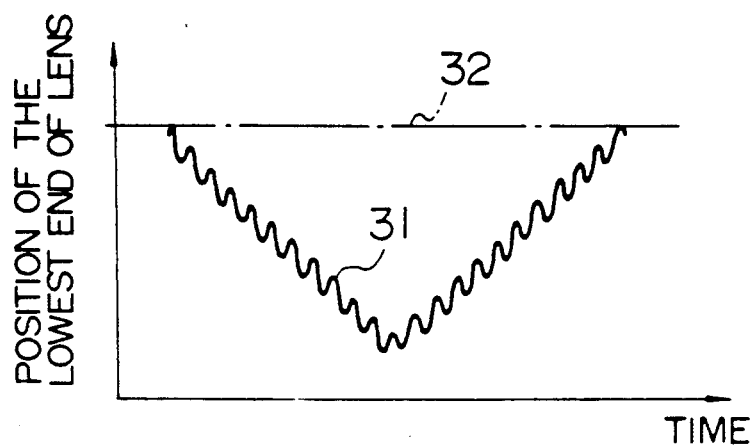
FIGS. 3 to 5 illustrate the problems associated with a conventional gradated dyeing method.
Figure 4:
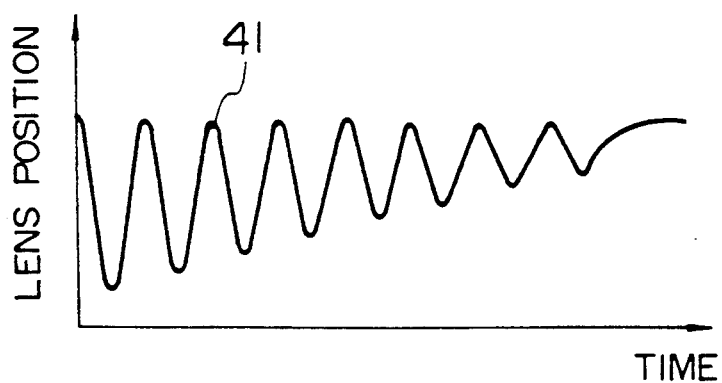
Figure 5:
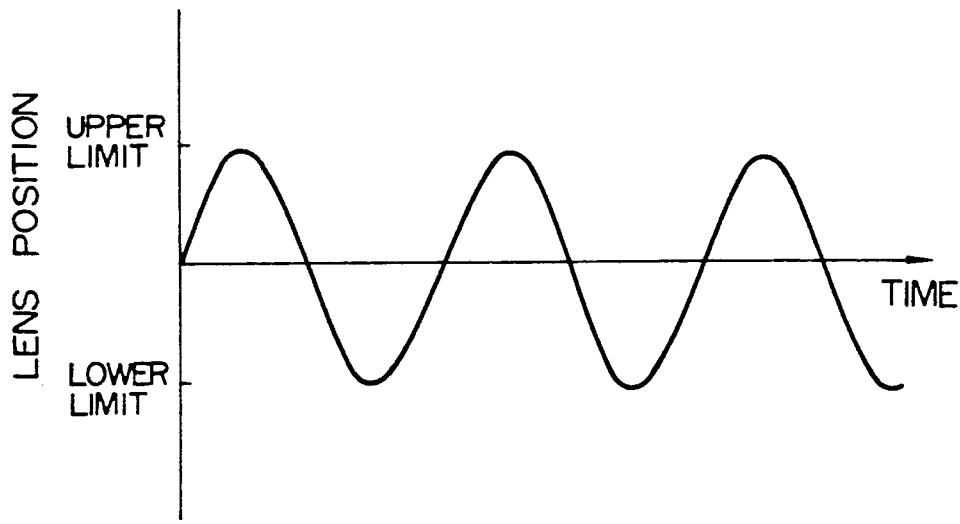

Embodiments of the present invention will be described below with reference to the accompanying drawings wherein FIG. 1 is a schematic view of an example of an apparatus used to carry out the lens dyeing method according to the present invention and FIGS. 2A and 2B are graphs, showing changes in the dipped position of the lens caused by the lens dipping motion of the lens dyeing method according to the present invention, particularly, changes in the position of the lowest end of the lens.

Referring first to FIG. 1, a lens retaining member 1 mounts a plurality of lenses 2 on which dyeing is to be conducted. The lenses 2 are mounted on the lens retaining member 1 in such a manner that the surface thereof is substantially vertical. It is possible to mount the lenses 2 on the member 1 in an inclined position. The lenses 2 in that state are carried to a predetermined reference position above a dyeing bath 3 before the dyeing operation is started. A dyeing solution 4 is present in the dyeing bath 3. The lenses 2 are moved down from the state shown in FIG. 1 and dipped into the dyeing solution 4 in the dyeing bath 3.

The lens retaining member 1 is fixed to the lower end of a rod 5 disposed in a vertical direction, and the rod 5 is in turn mounted on the right end as viewed in FIG. 1 of a support bar 6 disposed in a horizontal state. A mounting portion 6a of the support bar 6 has an adjusting mechanism for appropriately adjusting the position of the rod 5 at which the rod 5 is fixed to the support bar 6 and thus appropriately changing the positional relation between the surface of the dyeing solution 4 and the lenses 2. The mounting portion 6a has a fixing/adjusting screw 6c. The support bar 6 has an internally threaded portion 6b at its left and as viewed in FIG. 1. A guide member (not shown) for guiding the vertical movement of the support bar 6, which is conducted in a state in which the support bar 6 is horizontal, is provided.

The dyeing bath 3 is placed on a horizontal base 7, and a first stage 8 is fixedly placed on the base 7 adjacent to the dyeing bath 3. The stage 8 is placed on the base 7 in a horizontal state. On this stage 8 are placed a first driving motor 9 and a first shaft 10 whose outer periphery is threaded. The first shaft 10 is provided in such a manner as to be rotatable in its upright state. Although the structure for rotatably supporting the shaft 10 is present, it is not shown. A gear mechanism 11 is interposed between an output shaft 9a of the first driving motor 9 and the shaft 10 to convert the rotation of the driving motor 9 into the rotation of the shaft 10. Hence, when the driving motor 9 rotates in one direction, the shaft 10 rotates in accordance with the rotation of the driving motor 9.

A second stage 12 is provided in such a manner is to be movable only in the vertical direction. A supporting member of the second stage 12 is not shown in FIG. 1. The stage 12 is in mesh with the shaft 10 through an internally threaded portion formed on the stage 12. Consequently, when the shaft 10 rotates, the stage 12 moves up or down along the above-described supporting member (not shown) in a horizontal state in accordance with the rotation of the shaft 10. Smooth vertical movement of the stage 12 is accomplished by the use of a ball screw as the internally threaded portion of the stage 12 with which the shaft 10 is in mesh.

On the second stage 12 are disposed a second driving motor 13 and a second shaft 14. The second shaft 14 is provided in an upright state in such a manner as to be rotatable. The outer periphery of the second shaft 14 is threaded. A supporting member for rotatably supporting the shaft 14 is not shown. A gear mechanism 15 is provided to convert the rotation of an output shaft 13a of the driving motor 13 to the rotation of the shaft 14. Thus, the rotational force of the driving motor 13 is transmitted to the shaft 14 through the gear mechanism 15 to rotate the shaft 14 in accordance with the rotational force of the driving motor 13. The shaft 14 is in mesh with the internally threaded portion 6b of the support bar 6. Hence, when the shaft 14 rotates, the support bar 6 moves up or down in a horizontal state.

The first and second driving motors 9 and 13 may be pulse motors which rotate on the basis of separate control signals. Rotation of the driving motors 9 and 13 is controlled by a control device 16 which may be a computer. Various data for instructing rotation of the driving motors 9 and 13 is given through an input device 17.

In the thus-arranged dyeing apparatus, the driving motors 9 and 13 are rotated in two directions separately on the basis of respective control signals S1 and S2 which are output from the control device 16. Consequently, the support bar 6 is moved up and down (A) by the rotation of the driving motor 13 in two directions. This motion (A) is an up and down reciprocating motion having a small amplitude from a lowest position to a highest position and a short cycle time. The stage 12 is moved up and down (B) by the rotation of the driving motor 9 in two directions. This motion B is an up and down reciprocating motion having a large amplitude from a lowest position to a highest position and a long cycle time. The position of the lenses 2 changes in accordance with a motion which is the combination of the up and down motion A generated by the driving motor 13, superimposed on the up and down motion B generated by the driving motor 9. In the lens dyeing method according to the present invention, the motion B having the large amplitude and the long cycle time, which is generated by the driving motor 9 on the basis of the control signal S1, furthermore, has hereinafter mentioned features, as clearly shown in FIG. 2A.

Changes in the position of the lens caused during the dipping operation will be explained with reference to FIG. 2A.

In FIG. 2A, a reference numeral 20 denotes a trace which shows changes in the position of the lowest end of the lens 2 dipped into the dyeing solution 4 in the dyeing bath 3. In this trace 20, a1 denotes the duration of one complete cycle of the up and down reciprocating motion A having a small amplitude and a short cycle time, and b1 denotes the duration of one complete cycle of the up and down reciprocating motion B having a large amplitude and a long cycle time. Thus, the position of the lens dipped into the dyeing solution 4 is changed on the basis of the combination of the motion A generated by the driving motor 13, superimposed on the motion B generated by the driving motor 9, as stated above, to achieve gradated dyeing. The trace 20 denotes the superimposed combination of the up and down reciprocating motions A and B. In FIG. 2A, c1 denotes the initial position of the lowest end of the lens 2, i.e., the uppermost position of the lens 2 in the dyeing bath 3, and d1 denotes the lowermost position of the lens 2. As can be seen from FIG. 2A, the lowermost position of the up and down reciprocating motion B having a large amplitude and a long cycle time moves upward for each cycle without changing the amplitude of the motion B. A broken line 21 is the line formed by connecting the lowermost positions d1, d2 and d3. As shown by the broken line 21, the lowermost positions rise in a linear mode. This means that the up and down reciprocating motion B is wholly shifted upward by a predetermined constant distance for each cycle of the motion B. In this gradated dyeing method, when the lowermost position of the large-amplitude long-cycle time up and down reciprocating motion B rises for each cycle thereof, the boundary in the boundary portion between the dipped portion and the non-dipped portion of the lens 2 gradually lowers in accordance with the rise of the lowermost position of the up and down motion B reciprocating. In this embodiment, the lowermost position of the up and down reciprocating motion B rises in a linear mode, as shown by the broken line 21, but it may alternatively rise in a curved mode. In the curved mode, the reciprocating motion B is wholly shifted upward by a predetermined variable distance for each cycle of the motion B. The large-amplitude long-cycle time up and down reciprocating motion B by the driving motor 9 is generated by preparing in the control device 16 the program which controls the rotation of the driving motor 9 beforehand.

The lens dipping motion may also be arranged such that the speed at which the lens is dipped into the dyeing solution is slow at first and gradually increases until the lens reaches the lowermost position in the bath, and that, when the pulling up operation has been started, the speed at which the lens is pulled up is fast at first and gradually decreases.

Furthermore, the lens dipping motion may be arranged such that the entire surface of the lens is made wet by dipping the entirety of the lens into the stain solution temporarily (for about 1 to 2 seconds) immediately before the lens dyeing operation is started, in the midst of the up and down motion of the lens, or a combination of these two occasions, as shown in FIG. 2B. When the surface of the non-dyed portion of the lens is made wet by dipping one lens into the dyeing solution, the wettability of the hydrophobic surface of the lens is improved, thereby improving the coefficient of thermal conduction and making the boundary portion between the dyed portion and the non-dyed portion of the lens vague.

An example of the dyeing method according to the present invention will now be described below. In this example, a CR-39 lens (diethyleneglycol bis allylcarbonate polymer lens), subjected to a silicone type hard coating in the manner described below, was immersed in a dyeing solution having a temperature of 90° C. using the lens dipping motion contemplated by the present invention. The dye employed was BPI GRAY manufactured by BPI.

The coating liquid employed was prepared in the manner described below: 20 parts by weight of 0.05 normal hydrochloric acid solution was added into 240 parts by weight of $\gamma$-glycidoxypropyltrimethoxysilane while $\gamma$-glycidoxypropyltrimethoxysilane was being stirred. After dripping, the mixture was stirred for 24 hours to generate a product due to hydrolysis.

Substantially, 240 parts by weight of coloidal silica (water dispersed sol, having an average particle size of 25 nm and solids content of 40%), 34 parts by weight of Denacol EX-521 (polyglycerol polyglycidyl ether, manufactured by Nagase Chemicals Ltd), 80 parts by weight of methyl cellosolve, 120 parts by weight of isopropyl alcohol, 40 parts by weight of butyl alcohol, 0.2 parts by weight of a silicone type surfactant and 0.1 parts by weight of an ultraviolet absorber were added to the obtained product, and the obtained admixture was then stirred for 8 hours. Thereafter, 16 parts by weight of aluminum acetylacetonate (a hardening catalyst) was added to the admixture, and the obtained mixture was then matured for 32 hours to obtain a coating solution.

The hard coating film was formed in the manner described below: after the plastic lens was immersed for 5 minutes in 10% NaOH solution having a temperature of 50° C. and thereby washed thoroughly, the coating liquid prepared in the manner described above was coated on the surface of that plastic lens by the dipping method, and that coated film was then heated at 120° C. for 1 hour to harden it.

In the above dyeing operation, it took 60 seconds for one cycle b1 of the large-amplitude long-cycle time up and down motion B to be completed. In one cycle of the up and down motion B, the small-amplitude short-cycle time up and down motion A whose one cycle a1 lasted 10 seconds was performed six times. The amount of movement in the up and down motion B was 30 mm. The up and down motion B was generated such that the lowermost position of the lens in each cycle of the up and down motion B moved up by 1 mm. A conventional dyeing operation was performed as a comparative example under the same conditions as those of the above example with the exception that the lowermost position of the lens in each cycle of the up and down motion B remained the same.

Comparing these two dyeing operations, a clear boundary appeared between the dyed portion and the non-dyed portion of the lens on which the conventional dyeing method was conducted, whereas the color of the boundary portion between the dyed portion and the non-dyed portion of the lens on which the dyeing method according to the present invention was conducted was shaded off excellently.

In the dipping motion of the lens conducted in the dyeing method according to the present invention, the conditions, such as the amount of movement in the large-amplitude long-cycle time up and down motion B and the small-amplitude short-cycle time up and down motion A, the number of times the up and down motion A is conducted in one cycle of the up and down motion B, the period of each motion, the speed at which the lens is moved, the position of the deepest point, the amount of rise for each cycle of the up and down motion B, and dyeing time, can be arbitrarily set in accordance with the type of lens, the type of dye, the color density and the temperature of the dyeing solution. Setting of these conditions is performed through the input device 17. The configuration of the dyeing apparatus is not limited to that shown in FIG. 1 but the dyeing apparatus may be arranged such that the lens dipping motion shown in FIG. 2 is generated by employing a single driving motor and by controlling the operation thereof using an accordingly created program or by devising the mechanism of the dyeing apparatus. The lens dyeing method according to the present invention may also be applied to dyeing of the glass lenses which are subjected to the surface process.

Next, the normally employed hard coat film will be described below. A hard coat film made of, for example, an (POLY) organosiloxane is formed on a plastic and/or glass lens substrate by forming the layer of a compound selected from a group of compounds expressed by the following general formula and/or a group of the compounds generated due to the hydrolysis reactions of such compounds by means of dipping or coating and then by hardening that layer:

(R1)a(R2)b Si(OR3)4−(a+b)

(where R1 and R2 represent an organic group combined with silicon due to Si-C bonds, the organic group having an alkyl group having 1 to 10 carbons, an allyl group, alkyl halide, allyl halide, alkenyl, an epoxy group, a (meth) acryloxy group, a mercapto group or a cyano group, R3 represents an alkyl group having 1 to 6 carbons, an alkoxyalkyl group or an acyl group, a and b represent 0, 1 or 2, and a+b represents 1 or 2).

These organosilicic compounds may be employed solely or they may be combined with each other.

Various tetraalkoxysilanes or the compounds generated due to hydrolysis reactions thereof may also be employed together with the above-described organosilicic compounds.

Examples of such tetraalkoxysilanes include methyl silicate, ethyl silicate, n-propyl silicate, isopropyl silicate, n-butyl silicate, sec-butyl silicate and t-butyl silicate.

The above-described organosilicic compounds can be hardened in the absence of a catalyst. However, various catalysts may be used to accelerate hardening.

Examples of such catalysts include various acids or bases, such as Lewis acids and Lewis bases, metallic salts, such as organic carboxylic acid, chromic acid, hypochlorous acid, boric acid, bromic acid, selenious acid, thiosulfuric acid, ortho silicic acid, thiocyanic acid, nitrous acid, aluminic acid and carbonic acid, particularly, alkali metallic salts and ammonium salts, alkoxides of aluminum, zirconium and titanium, and complex compounds of these alkoxides.

The above-described organosilicic polymer may be used together with another organic substances. Examples of such organic substances include an epoxy resins an acrylic copolymer and a polymer having a hydroxyl group, such as polyvinyl alcohol.

Colloidal sol of an inorganic oxide, such as Sn, Al, Ti or Sb, disclosed in OPTIKA ACTA (published in July in 1962, on page 251), may be present in the hard coat film.

Solvents or various additives may also be added to facilitate the coating operation.

As will be understood from the foregoing description, according to the present invention, in the lens dyeing method in which the lens dipping motion is the superimposed combination of the small-amplitude short-cycle time up and down motion and the large-amplitude long-cycle time up and down motion, the lowest position of the large-amplitude long-cycle time up and down motion rises for each cycle. In consequence, the color of the boundary portion between the dyed portion and the non-dyed portion is given gradations without any boundary line generated thereon, and a gradient lens exhibiting excellent reproducibility can therefore be obtained regardless of the surface process of the lens. Also, it is possible to achieve the dyeing method by using a dyeing apparatus having a simple configuration.

We claim:

1. A lens dyeing method for dyeing a lens in such a manner that a continuous color density gradient occurs on surfaces of said lens, said method comprising the steps of dipping the lens into a dyeing solution while periodically changing the position of the lens according to a combination of a first mode of motion superimposed on a second mode of motion, the first mode of motion comprising an up and down reciprocating motion having a first amplitude from a lowest position to a highest position of said first mode of motion and a first cycle time, the second mode of motion comprising an up and down reciprocating motion having an amplitude from a lowest position to a highest position of said second mode of motion which is larger than said first amplitude of said first mode of motion, and a cycle time which is longer than said first cycle time of said first mode of motion, said combination of superimposed modes of motions being conducted such that said lens is minutely oscillated up and down according to said first mode of motion, while being periodically moved up and down in the dyeing solution according to said second mode of motion, and said second mode of motion is wholly shifted upward by a predetermined distance for each cycle of said second mode of motion thereby raising the lowest position reached by said lens during each successive down motion according to said second mode of motion for each cycle of said second mode of motion, to alter the position of a boundary defined between a dipped portion and a non-dipped portion on the surfaces of said lens.

2. A lens dyeing method according to claim 1, wherein said predetermined distance is constant.

3. A lens dyeing method according to claim 1, wherein said predetermined distance is constant.

4. A lens dyeing method according to claim 1, wherein said lens has formed thereon a hard coating film comprising an organic silicone compound.

5. A lens dyeing method according to claim 1, further comprising the steps of dipping the entirety of said lens into said dyeing solution for a predetermined period of time.

6. A lens dyeing method according to claim 5, wherein said dipping of the entirety of said lens is conducted prior to said step of periodically changing the position of the lens.

7. A lens dyeing method according to claim 5, wherein said step of periodically changing the position of the lens is conducted before and after said dipping the entirety of said lens.

8. A lens dyeing method for dyeing a lens in such a manner that a continuous color density gradient occurs on surfaces of said lens, said method comprising the steps of dipping the lens into a dyeing solution while periodically changing the up and down position of the lens according to a combination of a first mode of motion superimposed on a second mode of motion, the first mode of motion comprising an up and down motion having a relatively small amplitude and a relatively short cycle time, the second mode of motion comprising an up and down motion having a relatively large amplitude and a relatively long cycle time, said combination of superimposed modes of motions being conducted such that said lens is moved up and down according to said first mode of motion, and said second mode of motion is holly shifted upward by a predetermined distance for each cycle of said second mode of motion thereby raising a lowest position reached by said lens during each successive down motion according to said second mode of motion for each cycle of said second mode of up and down motion, to alter the position of a boundary defined between a dipped portion and a non-dipped portion on the surface of said lens.

* * * * *